United States Patent
Sorin et al.

[11] Patent Number: 5,850,287
[45] Date of Patent: Dec. 15, 1998

[54] ROLLER ASSEMBLY HAVING PRE-ALIGNED FOR ON-LINE THICKNESS MEASUREMENTS

[75] Inventors: Wayne V. Sorin, Mountain View; Shalini Venkatesh, Santa Clara; Brian L. Heffner, Los Altos, all of Calif.

[73] Assignee: Hewlett-Packard Company, Palo Alto, Calif.

[21] Appl. No.: 893,432

[22] Filed: Jul. 11, 1997

[51] Int. Cl.⁶ .................................................. G01B 9/02
[52] U.S. Cl. .......................... 356/357; 356/382; 356/345
[58] Field of Search ............................... 346/73.1, 345, 346/357, 400, 382

[56] References Cited

U.S. PATENT DOCUMENTS 4,937,449  6/1990  Kreuzer et al. ........................ 356/382
5,731,876  3/1998  Venkatesh et al. ..................... 356/357

*Primary Examiner*—Frank G. Font
*Assistant Examiner*—Andrew H. Lee

[57] ABSTRACT

An apparatus for measuring the thickness of a film on a production line or the like. The apparatus includes a moveable member in contact with the film. The moveable member rotates about a fixed member and includes a transparent region. The apparatus also includes an optical probe attached to the fixed member. The optical probe has an optical fiber for coupling a light signal to the film through the transparent region of the moveable member and for returning light reflected from the film to a receiver for determining the thickness of the film. The optical probe may also include a lens assembly for imaging the light signal onto the film and imaging the reflected light signals back into the optical probe. The optical probe may also include a partially reflecting reference reflector for simplifying the analysis of multi-layer films.

7 Claims, 4 Drawing Sheets

FIGURE 1

ROLLER ASSEMBLY HAVING PRE-ALIGNED FOR ON-LINE THICKNESS MEASUREMENTS

FIELD OF THE INVENTION

The present invention relates to optical reflectometry, and more particularly, to an apparatus for measuring the thickness and group index of a film, web or sheet.

BACKGROUND OF THE INVENTION

In many industrial processes, control of film thickness is of critical importance. For example, the manufacture of photographic film requires the generation of a uniform layer of emulsion on a backing. From the point of view of process control, it is advantageous to be able to measure the film thickness during the film generation process rather than measuring the film off-line in a laboratory after the film has been manufactured. If samples are measured off-line, correction of any machinery malfunction cannot be performed until after a considerable volume of defective material has been processed. This leads to waste. For the purposes of the present discussion, the term "film" includes sheets and webs.

Prior art methods for measuring film thickness may be divided into contact and non-contact methods. In one contact method, a micrometer that comes in physical contact with both sides of the film is employed. Contact methods have the disadvantage of physically deforming the film during the measurement leading to inaccurate measurements and possible damage to the film from pitting or scratching: In addition, these methods are difficult to apply to the on-line measurement of fast moving film webs.

Non-contact methods based on the attenuation of a beam of subatomic particles or radiation such as beta particles or gamma rays are also known to the prior art. For example, the attenuation of a beam of electrons by the film is used to determine the film thickness in one prior art method of this type. This methodology has four disadvantages. First, the system must be calibrated for each type of film, since the attenuation depends on the chemical composition and density of the film. Second, the system typically relies on a radioactive source to generate the particle beam. It is generally desirable to limit the use of radioactive material for cost, safety, and psychological reasons. Third, access is normally required to both sides of the film so that the source can be placed on one side and the detector on the other. Finally, this method cannot determine the individual thicknesses in a multi-layer film.

Methods for measuring the thickness of films using an optical autocorrelator are also known to prior art. For the purposes of this discussion, an optical autocorrelator is defined to be an interferometer having a variable differential time delay. One embodiment of an optical autocorrelator is described, for example, in chapter 5 of *Statistical Optics*, by Joseph W.

Goodman (John Wiley & Sons, 1985, pp. 157–170). Those skilled in the art are aware of the principles of operation of an optical autocorrelator, but certain principles will be clarified here because of their relevance to this patent. In an autocorrelating interferometer wherein light is split into two different paths and then recombined and directed to a photodiode, the detected light intensity is measured as a function of a parameter. This parameter can be the differential optical path length $\Delta L$ of the interferometer or it can be the differential time delay $\Delta t$ of the interferometer. These parameters are related by $\Delta L = c\, \Delta t/n$, where c is the speed of light in vacuum and n is the group index of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path delay between light reflected from different surfaces of a film. Determining the spacing between peaks in the coherence function of the reflected light is yet another way to describe the same function. For the purposes of the present discussion, the term differential time delay shall include differential path delay.

A Michelson interferometer is an example of such an autocorrelator. An example of an apparatus for measuring film thickness which utilizes a Michelson interferometer is taught in U.S. Pat. No. 3,319,515 to Flournoy. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input. Unfortunately, this method can determine only the product of the group index and the film thickness. If a variation is detected in this quantity, additional measurements must be made to determine if the film composition has changed or the thickness has changed. The group index is defined to be the ratio of the propagation velocity of a light pulse in a vacuum relative to the velocity of propagation of the pulse in the medium.

If the film consists of a number of layers having different thicknesses or indices of refraction, the above method cannot always provide an unambiguous answer with respect to the product of the thickness and index of refraction for each layer. The output of the autocorrelating interferometer consists of a number of peaks whose locations depend on the difference in optical path length for each possible pair of reflecting boundaries. As the number of boundaries increases, the number of peaks increases rapidly. For example, a three layer film will generate an output having 13 peaks corresponding to the various "single pass" reflections in the system described above. There will be additional peaks corresponding to light that is reflected more than once in the film.

In U.S. Pat. No. 5,633,712, a method for simplifying the autocorrelation spectrum obtained from a multi-layer film is described. In this method, a reference surface is introduced near the film. The reflections from this reference surface provide a method for simplifying the spectrum and for determining the thicknesses of the various layers.

While the autocorrelation spectrum measurements discussed above provide a method for measuring the thickness of films, the apparatus requires optical alignment. A probe having the reference surface and other optical components must be aligned with respect to the film. The probe is typically positioned with respect to a roller over which the film moves to maximize the optical signal generated by the various reflections. This alignment requires skilled operators with special training. Such operators are not always available on production lines. Accordingly, the use of this type of autocorrelation spectrum analysis has been hindered.

Broadly, it is the object of the present invention to provide an improved apparatus and method for measuring the thickness and index of refraction of a thin film.

It is a further object of the present invention to provide a system that does not require alignment of the optical components in the production environment.

These and other objects of the present invention will become apparent to those skilled in the art from the following detailed description of the invention and the accompanying drawings.

SUMMARY OF THE INVENTION

The present invention is an apparatus for measuring the thickness of a film on a production line or the like. The apparatus includes a moveable member in contact with the film. The moveable member rotates about a fixed member and includes a transparent region. The apparatus also includes an optical probe attached to the fixed member. The optical probe has an optical fiber for coupling a light signal to the film through the transparent region of the moveable member and for returning light reflected from the film to a receiver for determining the thickness of the film. The optical probe may also include a lens assembly for imaging the light signal onto the film and imaging the reflected light signals back into the optical probe. The optical probe may also include a partially reflecting reference reflector for simplifying the analysis of multi-layer films.

DETAILED DESCRIPTION OF THE INVENTION

Figure 1:
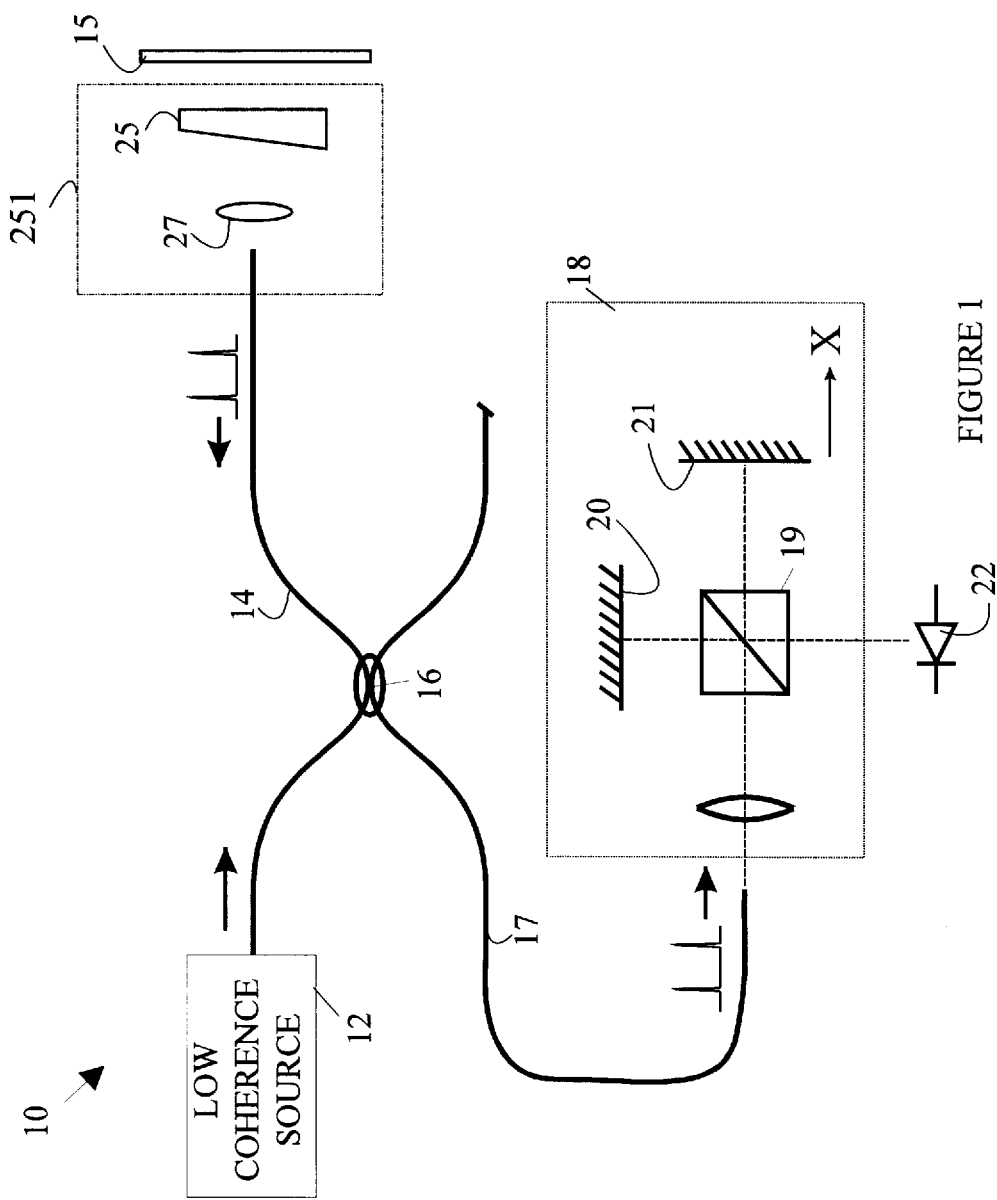
FIG. 1 is a schematic drawing of a thickness monitoring apparatus that utilizes a partially reflecting reference reflector.

The method by which the present invention attains its advantages over the prior art may be more easily understood with reference to FIG. 1 which is a schematic drawing of a thickness monitoring apparatus that utilizes a partially reflecting reference reflector 25. Apparatus 10 utilizes a low coherence light source 12 to generate a light signal that is applied to the film 15 to be measured. A partially reflecting reference reflector 25 is located within the optical path such that reflections from the film and reference reflector are reflected back into fiber 14. The signal collected by fiber 14 that passes through film 15 is collected by lens 27 and routed to a receiver 18 with the aid of a coupler 16 and fiber 17. Receiver 18 is preferably an autocorrelator; however, other forms of receivers may be utilized.

The coherence length of light source 12 must be small compared to the thickness of the film being measured. Such light sources are common in the optical reflectometry arts, and hence, will not be discussed in detail here. For the purposes of the present discussion, it is sufficient to note that an edge emitting light emitting diode may be utilized for light source 12.

An exemplary autocorrelator 18 constructed from a Michelson interferometer is shown at 18. The light incident on the Michelson interferometer is split into two beams that traverse different paths by beam splitter 19. The first path is determined by the position of fixed mirror 20 and the second by moveable mirror 21. After traversing the different paths, the light is recombined by splitter 19 and directed to photodiode 22 which measures the intensity of the light which varies with the position of mirror 21 due to the interference of the light.

Whenever the difference in the reference arms of the interferometer is equal to the difference in optical path length between two different surfaces that have reflected the light, a peak in intensity will be generated at photodiode 22. There will always be a large peak at x=0 corresponding to the case in which each reflection overlaps with itself.

As noted above, the probe assembly 251 must be aligned with respect to the film 15 to maximize the signal collected by fiber 14. This alignment process requires skills beyond those available on the typical production line, and hence, has hampered the utilization of the measurement technique.

Figure 2:
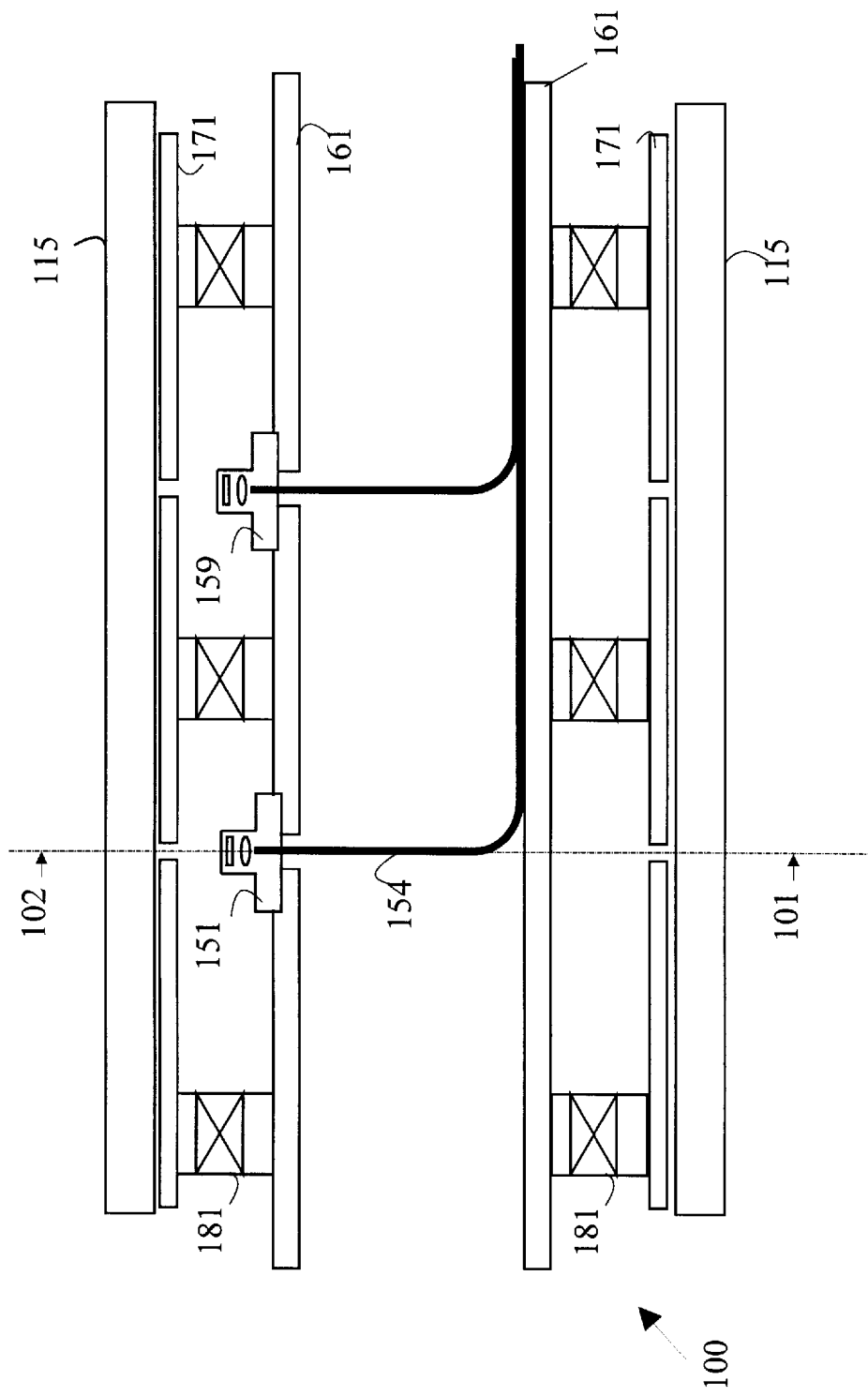
FIG. 2 is a cross-sectional view of a roller assembly according to the present invention.
Figure 3:
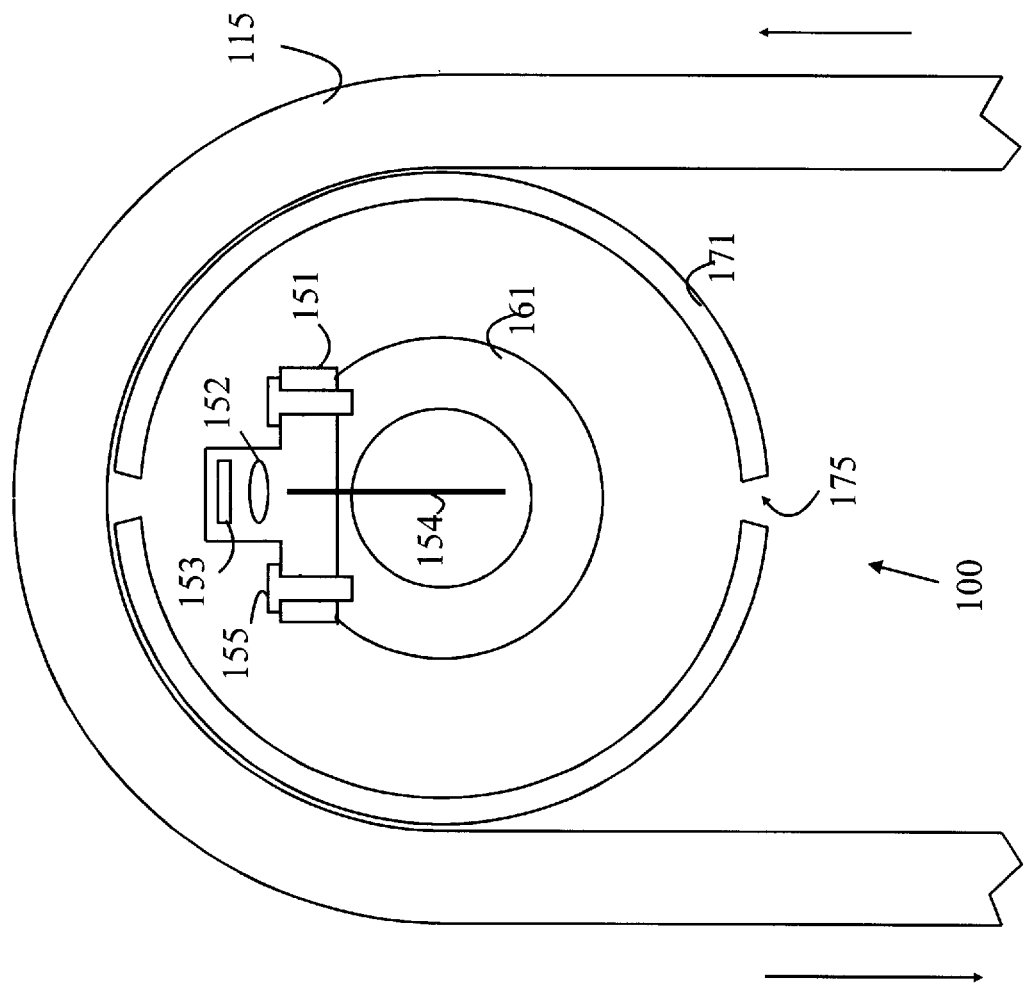
FIG. 3 is cross-sectional view of the roller assembly shown in FIG. 2 through line 101–102.

One embodiment of the present invention avoids this alignment process by incorporating the probes into a roller over which the film passes. The probes are pre-aligned with respect to the roller, and hence, no alignment is required on the production line. Refer now to FIGS. 2 and 3. FIG. 2 is a cross-sectional view of a roller 100. FIG. 3 is cross-sectional view of roller 100 through line 101–102. Roller 100 includes a fixed inner tubular member 161 and a moveable member 171 over which the film 115 to be measured passes. The fixed member 161 and moveable member 171 are maintained in relative position with one another with the aid of bearings 181.

One or more optical probe assemblies are fastened to inner tube 161 with the aid of a suitable fastener 155. Exemplary probe assemblies are shown at 151 and 159. Each probe assembly includes an optical fiber 154 for transmitting the low coherence light signal to film 115 and collecting the various reflected light signals. A lens 152 is included in the probe assembly for imaging the light signal onto the film and imaging the reflected light signals back into fiber 154. If film 115 is a multi-layer film, a reference reflector 153 is also included in each of the optical probe assemblies.

The optical fibers from each of the probes exit roller 100 through the fixed inner tube 161. The optical probe assemblies are aligned with respect to the outer moveable tube prior to being shipped to the manufacturing site. Hence, no alignment is needed at the production site. The movable outer roller 171 is transparent in the region of measurement. For example, the movable outer roller may be made, at least in part, of transparent material, or may have holes that provide optical access to film 115, such as shown at 175 in FIG. 3. The holes 175 may extend completely around outer roller 171, so that outer roller 171 is divided into sections, each section being supported by at least one bearing 181.

From the above discussed embodiment of the present invention, it will be apparent that the key to providing alignment free operation of a measurement system according to the present invention is arranging the optical probes on a fixed member that is pre-aligned to the roller over which the film passes. This alignment mechanism must allow for the loading and unloading of the film from the measurement system without altering the alignment. In the embodiment discussed with respect to FIGS. 2 and 3, this is accomplished by placing the probes inside the roller on a fixed member whose relationship with the roller is set at the time of alignment of the system.

Figure 4:
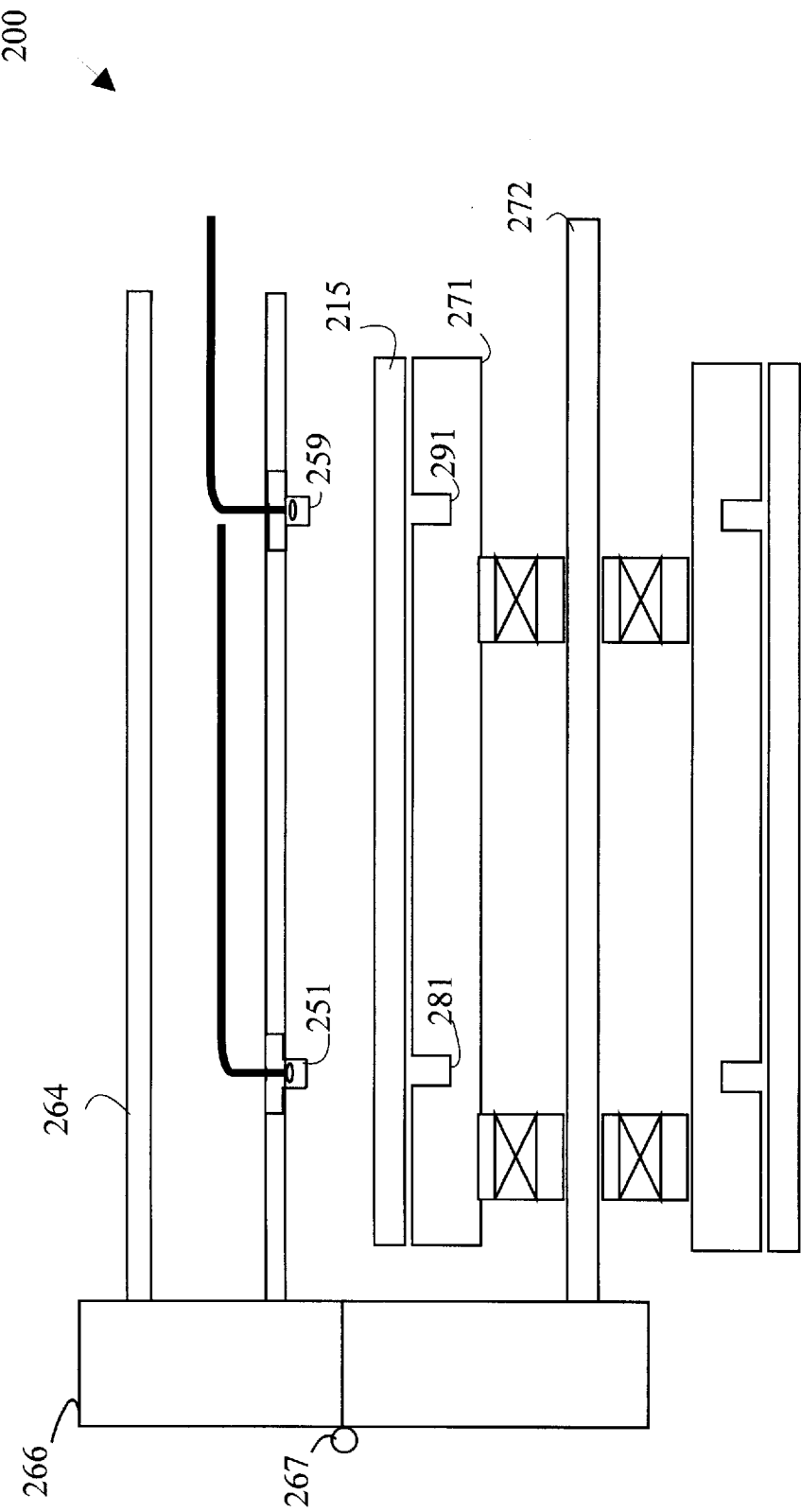
FIG. 4 is a cross-sectional view of another embodiment of the present invention.

Other arrangements are possible without deviating from the teachings of the present invention. Refer now to FIG. 4 which is a cross-sectional view of another embodiment of a measurement apparatus according to the present invention. Measurement apparatus 200 measures the thickness of film 215 with the aid of optical probes 251 and 259. The optical probes are located outside of the roller 271 over which film 215 passes on a member 264. The alignment of the optical probes with the roller is maintained by fixed member 266 which maintains the relationship between shaft 272 about which roller 271 rotates and member 264. To simplify the loading of the film into apparatus 200, member 266 may include a hinged joint 267 which allows member 264 to be rotated to expose roller 271 during film loading.

It should be noted that the partially reflecting reference reflector may be included in roller 271 as shown at 281 and 291. In this arrangement, a recess in roller 271 having a partially reflecting surface at the bottom thereof provides the reference reflection. However, the partially reflecting reference surface may also be incorporated in the optical probes as discussed with respect to the embodiment shown in FIGS. 2 and 3.

Various modifications to the present invention will become apparent to those skilled in the art from the foregoing description and accompanying drawings. Accordingly, the present invention is to be limited solely by the scope of the following claims.

What is claimed is:

1. An apparatus for measuring the thickness of a film moving through said apparatus, said apparatus comprising:

a moveable member in contact with said film, said moveable member rotating as said film moves through said apparatus with respect to a fixed member that does not rotate;

an optical probe connected to said fixed member, said optical probe comprising an optical fiber for coupling a light signal to said film and for returning light reflected from said film to a receiver for determining the thickness of said film; and an alignment mechanism for aligning said optical probe with respect to said moveable member such that said alignment is not altered when said film is introduced into said apparatus.

2. The apparatus of claim 1 wherein said moveable member comprises a cylinder having a transparent region and wherein said fixed member is inside of said cylinder, said optical fiber coupling said light signal through said transparent region.

3. The apparatus of claim 2 wherein said optical probe further comprises a lens for imaging light leaving said optical fiber onto said film.

4. The apparatus of claim 2 wherein said optical probe further comprises a partially reflecting reference reflector.

5. The apparatus of claim 2 wherein said moveable member and said fixed member comprise coaxial cylinders.

6. The apparatus of claim 1 wherein said moveable member comprises a cylinder and wherein said fixed member is positioned outside of said cylinder.

7. The apparatus of claim 6 wherein said cylinder includes a partially reflecting reference surface.

\* \* \* \* \*